United States Patent [19]
Richard

[11] Patent Number: 5,290,434
[45] Date of Patent: Mar. 1, 1994

[54] EFFLUENT DOSING SEPTIC SYSTEM

[76] Inventor: James G. Richard, 20 Woodland Dr., Canton, Conn. 06019-2004

[21] Appl. No.: 16,127

[22] Filed: Feb. 10, 1993

[51] Int. Cl.$^5$ .............................................. E03F 7/00
[52] U.S. Cl. .................................... 210/109; 210/121; 210/170; 210/248; 210/532.2; 137/578; 137/589; 137/398; 405/36
[58] Field of Search ............... 137/578, 589, 397, 318; 405/36; 210/121, 123, 170, 532.2, 533, 534, 535, 536, 248, 109

[56] References Cited

U.S. PATENT DOCUMENTS

| | | | |
|---|---|---|---|
| 815,272 | 3/1906 | Devereux | 210/533 |
| 1,528,003 | 3/1925 | Yarnall | 137/578 |
| 2,157,405 | 5/1939 | Frey | 137/578 |
| 2,427,102 | 9/1947 | Hale | 210/121 |
| 2,944,669 | 7/1960 | Schaaf | 210/536 |
| 3,545,617 | 12/1970 | Hamrick | 210/532.2 |
| 3,844,946 | 10/1974 | Farrell, Jr. | 210/257.1 |
| 4,230,578 | 10/1980 | Culp et al. | 210/121 |
| 4,439,323 | 3/1984 | Ball | 210/532.2 |
| 4,512,883 | 4/1985 | Thompson | 210/123 |
| 4,834,879 | 5/1989 | Stegall et al. | 210/532.2 |
| 4,838,731 | 6/1989 | Gavin | 210/532.2 |
| 4,891,128 | 1/1990 | Goronszy | 210/121 |
| 4,959,145 | 9/1990 | Meyers | 210/532.2 |
| 5,068,031 | 11/1991 | Wang et al. | 210/96.1 |
| 5,123,444 | 6/1992 | Persson et al. | 137/578 |

Primary Examiner—Peter A. Hruskoci
Assistant Examiner—Robert James Popovics
Attorney, Agent, or Firm—St. Onge Steward Johnston & Reens

[57] ABSTRACT

The invention presented relates to a septic system which doses effluent into a disposal field. More particularly, the invention includes a relatively water-tight walled structure capable of accumulating a volume of septic tank effluent; a disposal field dosing system having at least one outlet conduit having an outlet end and an inlet end; a stand pipe which extends from each of the outlet conduits towards the top of the structure; a float having a chamber having an opening on an upper surface thereof; at least one feed conduit having an inlet end located within the chamber and an outlet end in operative connection with the inlet end of the outlet conduit; and a jointed coupler which forms the operative connection between the feed conduit(s) and outlet conduits.

16 Claims, 4 Drawing Sheets

EFFLUENT DOSING SEPTIC SYSTEM

TECHNICAL FIELD

The present invention provides a septic system which permits dosing of the effluent from a septic tank into a disposal field to facilitate even spreading of the effluent throughout the disposal field.

Conventional disposal systems for waste water from a residence or other building comprise a septic tank or other type of box-like structure into which waste water flows via an outlet pipe from the residence or other building. The effluent is then fed to a disposal or drain field via a pipe exiting the septic tank. However, because the rate of flow of liquid into the septic tank is relatively slow, on the order of less than about one gallon per minute ("Flow Distribution By Gravity in Perforated Pipe", R. E. Machmeier, J. L. Anderson), the effluent is not effectively distributed throughout the septic field. Experience has shown that a septic field will progressively clog as a result of this poor distribution of the effluent.

It has been recognized that discharging the effluent from the septic tank in relatively large "incremental doses" is superior to a conventional "dribbling" or "trickling" of the effluent from the septic tank. This is because an incremental dose travels at a greater velocity than dribbled effluent and, therefore, spreads the effluent more evenly throughout the disposal field with reduced clogging of the upstream portion of the field. In addition, because dosing of the effluent involves periods of "rest" between the dosing cycles, percolation of the effluent through the drain field is facilitated during the rest periods, providing greater capacity for the effluent.

What is desired, therefore, is a system for dosing effluent into a disposal field which can be used in a septic system and which is effective at providing dosing of the effluent from a residence or other building and is resistant to failure.

BACKGROUND ART

Dosing systems for septic fields have been suggested in the past, generally involving the use of siphons or pumps. However, pumps are a potential source of trouble and consume energy. They are expensive and complex to install and should be used only when the disposal field is at a higher elevation than the outlet of the septic tank. Siphons are simple and rely on gravity to operate but they are also disadvantageous. Because of their downward projecting trap, siphons are difficult to incorporate into a precast concrete structure and require extensive work to install in the field. Siphons rely upon a small diameter vent tube to operate, which is prone to clog, rendering the siphon inoperable. They also waste elevation to achieve sufficient "draw down" which can be a problem in installations with minimal elevation changes.

In U.S. Pat. No. 4,439,323, Ball proposes a pump-driven septic system which provides dosing of effluent into a septic field. However, as discussed above, the use of a pump has disadvantages, due to breakdown and energy consumption. Accordingly, pumps should only be incorporated where the disposal field is at a higher elevation than the outlet of the septic tank, which requires the energy needed to pump the effluent "up hill".

In U.S. Pat. No. 4,838,731, Gavin proposes a dosing "box" for a septic system having a pivoting tray with a counterweight. The tray is filled with effluent as it enters the tank and when the weight of effluent in the tray overcomes the counterweight, the tray tips and spills its contents to the septic tank outlet. Once emptied, the tray then returns to its upright position. The use of such a tray, however, can be undesirable because of its limited size. In fact, Gavin specifies that the tray of his invention is 2.3 gallons in volume. This is a significant limitation since the flow of effluent into the septic tank is not completely uniform and the tray of Gavin can easily be overwhelmed by the inflow of effluent.

DISCLOSURE OF INVENTION

It is an object of the present invention to provide a septic system which doses effluent into a disposal field. It is another object of the invention to provide a septic system which is relatively easy to install and does not consume energy, yet is reliable and not prone to breakdown, clogging, or other failure. It is still another object of the invention to provide an effluent dosing septic system which can easily accommodate the effluent from a residence or other building regardless of variations in the rate of flow.

These objects and others as set forth herein are provided by a septic system which doses effluent into a disposal field. In accordance with the invention a floating outlet dosing chamber permits accumulation of a volume of septic tank effluent in a storage structure and sudden release of the effluent, thereby "dosing" the septic field to avoid the problems which plague prior art effluent dosing systems.

The inventive septic system comprises a relatively water-tight walled structure which is capable of accumulating a volume of septic tank effluent therein and a means for feeding septic tank effluent to the walled structure from a residence or other building.

Cooperating with the walled structure is a disposal field dosing system which comprises at least one outlet conduit which extends through a wall of the structure at or near the bottom thereof such that an outlet end of the outlet conduit extends (either directly or through cooperating conduits) to a disposal field. The portion of the outlet conduit which extends within the walled structure lies at the bottom of the structure and functions to drain effluent. Preferably, the outlet conduit lies in an orientation relatively parallel to the bottom of the structure.

The dosing system also has a stand pipe which extends from the at least one outlet conduit. The stand pipe extends from the outlet conduit towards the top of the structure such that the opening of the stand pipe is located at a level in the structure which defines a maximum level of septic tank effluent in the structure. The stand pipe provides for the venting of air to the outlet conduit as the floating outlet dosing chamber sinks, as described in more detail hereinbelow and, in the event of a malfunction of the "dosing" mechanism, functions as an overflow conduit and permits drainage of the effluent. In other words, when the level of effluent in the walled structure reaches the noted maximum level, the effluent flows through the stand pipe conduit and into the outlet conduit from where it is fed to the disposal field.

The stand pipe permits air to enter and exit the system during the period of time the floating outlet dosing chamber is immersed in the effluent. As the "dose" of effluent enters the disposal field, gases may be forced back into the structure, and the stand pipe permits these gases to exit.

The dosing system also contains a floating outlet dosing chamber which utilizes a float having a chamber therein with an opening on an upper surface thereof. At least one feed conduit is disposed such that it has an inlet end located within the chamber and an outlet end in operative connection with the inlet end of the outlet conduit. Most preferably, there are the same number of feed conduits as outlet conduits, each of the feed conduits having an inlet end located within the float and an outlet end in operative connection with one of the outlet conduits. Each feed conduit is generally joined to each outlet conduit by a jointed coupler between each feed conduit and each outlet conduit to permit flexible connection between the two conduits.

In operation, the float sits at or near the bottom of the walled structure until effluent is fed into the structure. As effluent is fed into the structure, it causes the float to rise. Once the float has risen to its maximum point (which should be below the level of the opening of the stand pipe), the effluent level continues to rise in the structure until it reaches the opening in the float. When this occurs, the effluent fills the float chamber, which causes the float to sink. Once the float sinks, the effluent flows through the feed conduit to the outlet conduit and into the disposal field. When sufficient effluent has flowed through the float and into the disposal field such that the effluent level in the structure is no higher than the height of opening of the float, effluent no longer enters the float, which drains and begins to float again until the cycle is repeated. Meanwhile, the effluent which has been "dosed" into the disposal field percolates downward, providing capacity for more effluent.

Other objects, aspects, and features of the present invention, in addition to those mentioned above, will be pointed out in, or will be understood from the following detailed description, provided in conjunction with the accompanying drawings.

DETAILED DESCRIPTION OF THE INVENTION

Figure 1:
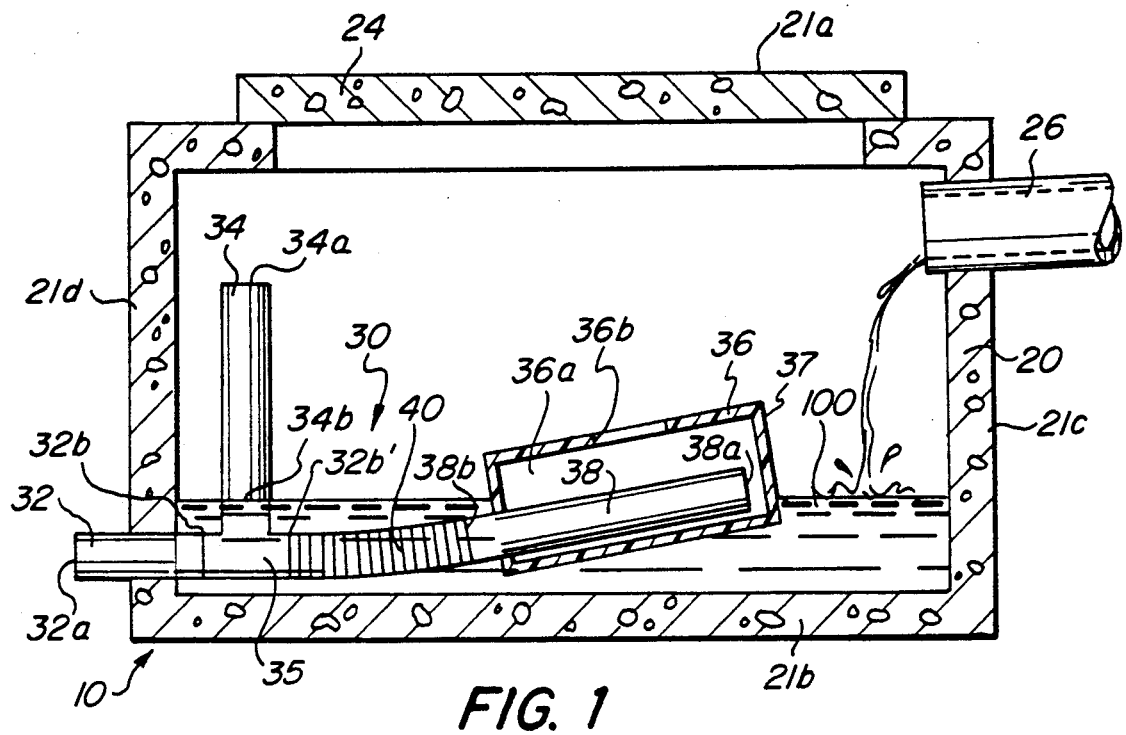
FIG. 1 is a cross-sectional side plan view of a septic system according to the present invention showing the float at the point where inflow of effluent begins to enter the chamber.

Referring now to FIGS. 1-6, where like elements are identified by like numbers in the drawings, a septic system is shown generally at 10, which is suited for dosing effluent into a disposal field (which term shall be used interchangeably with drain field, septic field, leach field, and other like terms). For ease of description, not all reference characters are shown in each drawing figure.

Referring now to FIGS. 1-4, septic system 10 comprises a relatively water-tight walled structure 20 having a top wall 21a, a bottom wall 21b, and four side walls (only two of which, 21c and 21d, are shown). Structure 20 is capable of accumulating a volume of septic tank effluent, denoted as 100. Structure 20 generally comprises a tank 20 formed of concrete or other like material which is sufficiently dimensionally stable to maintain its structural integrity after burial and resistant to deterioration caused by wastes and other effluent constituents. The top wall 21a of tank 20 also generally comprises a cover 24 which permits access to the interior of tank 20 for repair, cleaning, and other maintenance operations.

The septic system 10, as illustrated in FIGS. 1-4, also comprises a means for feeding septic tank effluent 100 to structure 10. Such means can comprise a conduit 26 which extends through a wall 21c of structure 20 and feeds effluent from a source (not shown) such as a septic tank or a residence or other building. Preferably, feeding conduit 26 extends through wall 21c of structure 20 at or near the top thereof. At the very least, feeding conduit 26 should extend through wall 21c of structure 20 at a level above the maximum effluent level of structure 20, to facilitate feeding of the effluent thereinto and to prevent "backup" of the effluent into the septic tank or residence or other building.

Depending on the relative position of structure 20 with respect to the source of effluent, effluent 100 may be fed to structure 20 by gravity or via a pump (not shown). For instance, if septic system 10 is located at or near a disposal field which lies in a plane above the level of the source of effluent, it may be desired to provide effluent 100 to structure 10 by a pump or other like means. However, it is highly preferred that septic system 10 and its disposal field be located at a level below that of the source of effluent to permit gravity fed flow of effluent 100 into structure 10.

Referring still to FIGS. 1-4, inventive septic system 10 further comprises a disposal field dosing system 30 comprising an outlet conduit 32, a stand pipe 34, a float 36, a feed conduit 38, and a jointed coupler 40. Outlet conduit 32 can be any known conduit useful for the flow of septic tank effluent 100 therethrough. Generally, outlet conduit 32 comprises a pipe formed of degradation resistant material such as a high density plastic like polyvinylchloride (PVC) or polyethylene.

Conduit 32 extends through wall 21d of structure 20 near the bottom thereof such that an outlet end 32a of conduit 32 extends to a disposal field, either directly or through a series of other conduits, trenches, or other means for distribution of the effluent to or through a disposal field, as would be familiar to the artisan. An inlet end 32b of outlet conduit 32 lies within structure 20 such that conduit 32 lies within structure 20 in an orientation relatively parallel or at a downward slope from inlet end 32b to outlet end 32a with respect to the bottom wall 21*b* of structure 20. Outlet end 32*a* functions as a drain and is preferably at the lowest point of structure 20.

One outlet conduit 32 is generally sufficient for satisfactory operation of disposal field dosing system 30. However, in an advantageous embodiment of the present invention, illustrated with respect to FIG. 6, there are a plurality of outlet conduits designated 32', 32", 32''' etc. to facilitate the feeding of effluent from septic system 10 to a disposal field, or a plurality of disposal fields.

Figure 6:
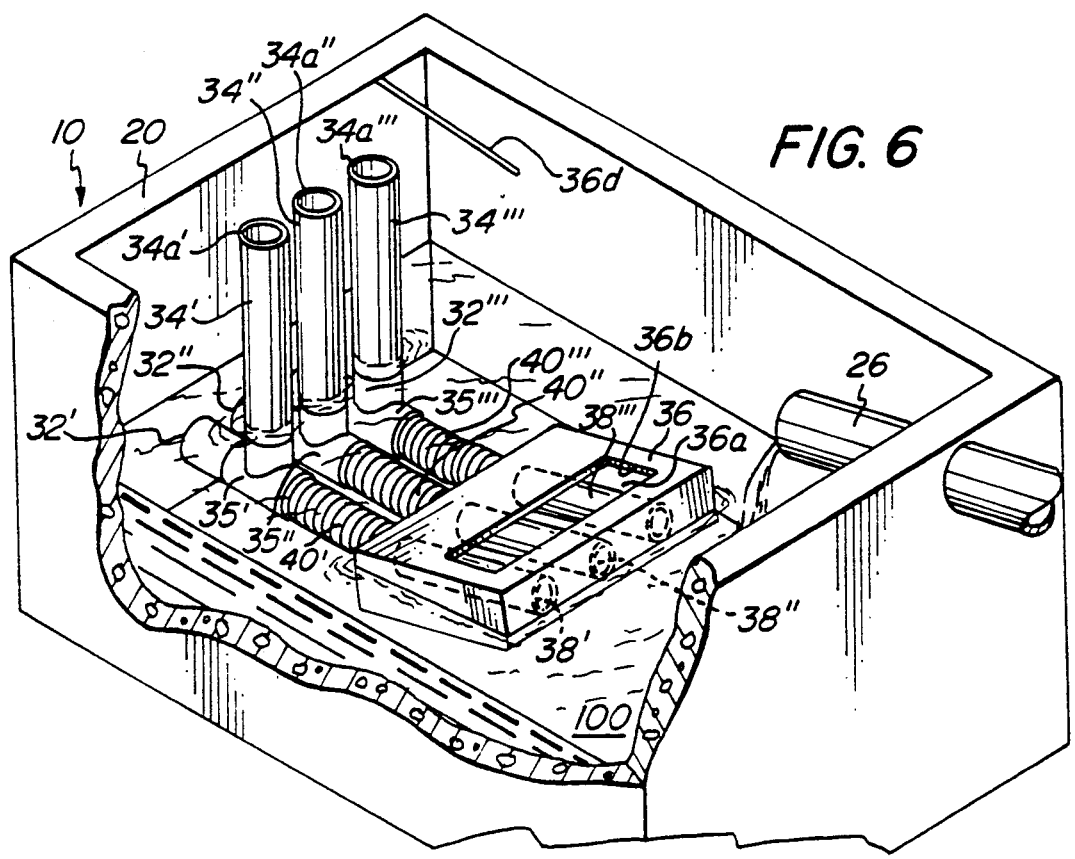
FIG. 6 is a partially broken away perspective view of an alternate embodiment of the disposal field dosing system of the present invention having a plurality of outlet conduits, overflow conduits, and feed conduits.
Figure 7:
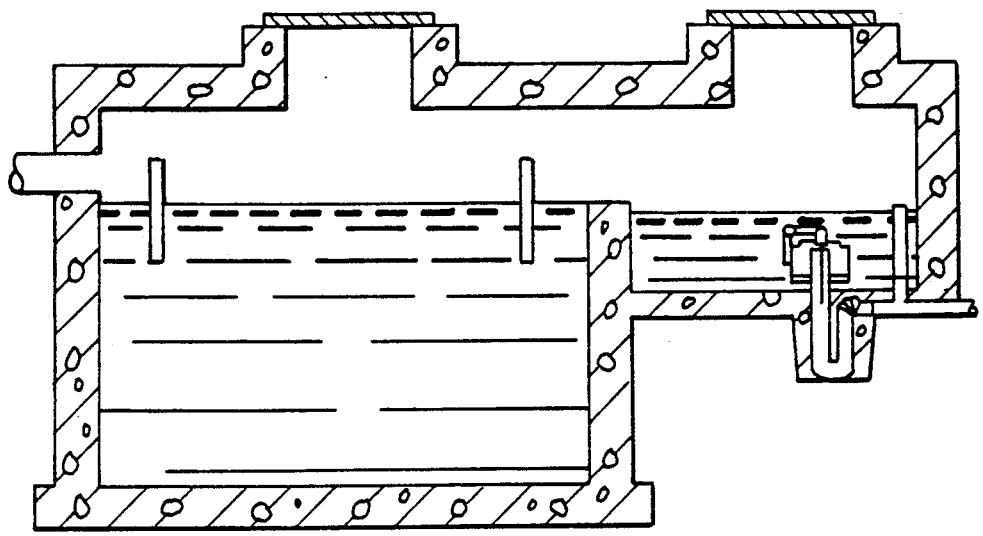
FIGS. 7 and 8 are cross-sectional side plan views of prior art siphon-driven dosing systems.
Figure 8:
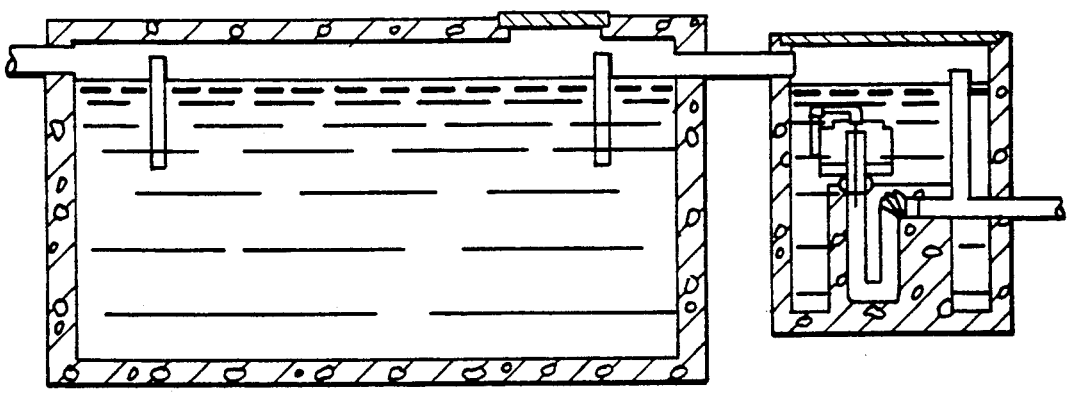

For each outlet conduit 32 of disposal field dosing system 30, there is a stand pipe 34 (or as illustrated in FIG. 6, 34', 34", 34''', etc.). Stand pipe 34 extends from outlet conduit 32 towards the top of structure 20. Generally, stand pipe 34 extends straight upwards (i.e., at a 90° angle with respect to conduit 32). However, such is not critical to its function. Stand pipe 34 extends from outlet conduit 32 such that an opening 34*a* of stand pipe 34 (generally configured at the upper end of stand pipe 34) is located at a level in structure 20 which defines a maximum high point of septic tank effluent 100 in structure 20. By this is meant that opening 34*a* of stand pipe 34 is located at a level within structure 20 such that the level of effluent in structure 20 cannot rise so high as to overflow structure 20 or backup into feeding conduit 26.

Stand pipe 34 is preferably formed of a high density plastic pipe similar to that of outlet conduit 32. As noted, stand pipe 34 functions to prevent overfilling of structure 20 by allowing effluent 100 to flow therethrough from opening 34*a* and into outlet conduit 32 and to the disposal field, when the effluent level in structure 20 reaches opening 34*a*. Although this is expected to be unusual, it can happen if solids enter structure 20 and clog disposal field dosing system 30 or the inflow of effluent into structure 20 is unexpectedly high. Stand pipe 34 also function to permit the flow of air and other gases both to and from outlet conduit 32, for venting and other purposes.

Stand pipe 34 can extend from outlet conduit 32 by any means familiar to the skilled artisan. Most preferably, stand pipe 34 is attached to outlet conduit 32 via a "tee" connector 35 where one end of tee connector 35 is mounted to inlet end 32*b* of conduit 32, the opposite end of tee connector 35 thereacross becomes a new inlet end 32*b'* of outlet conduit 32 and the orthogonal connector of tee connector 35 is mounted to a lower end 34*b* of stand pipe 34.

Figure 5:
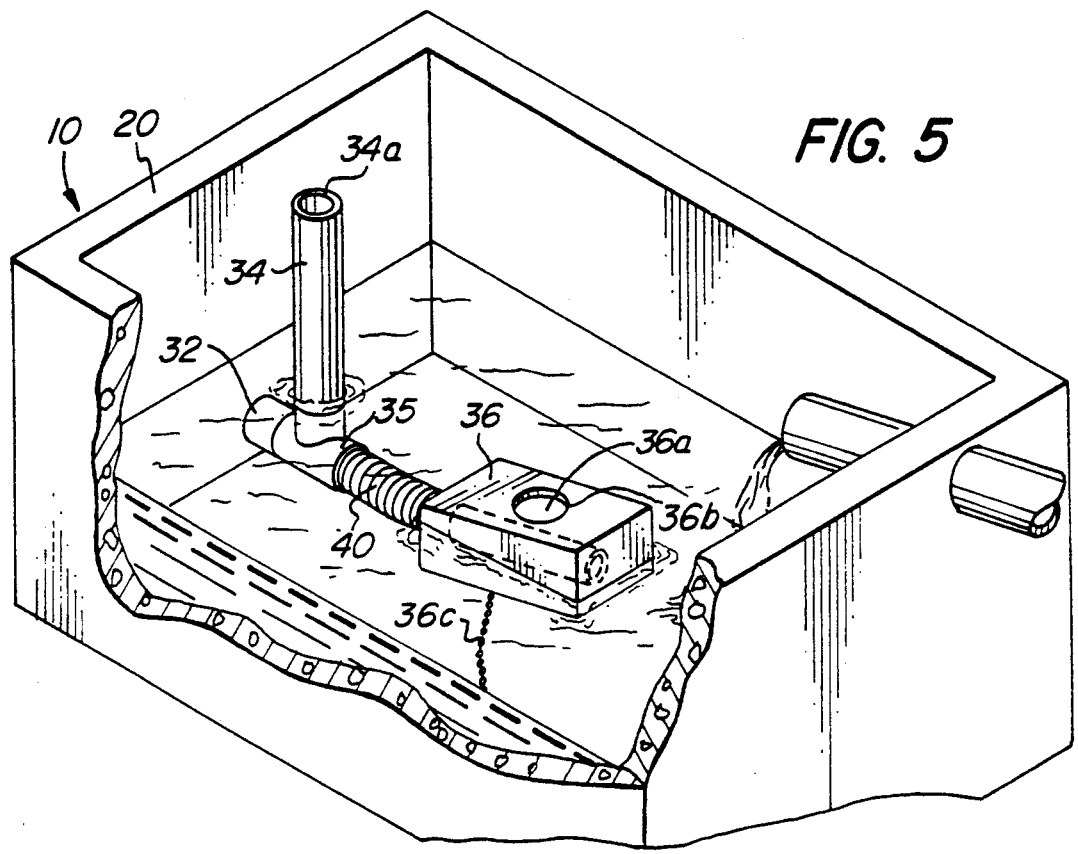
FIG. 5 is a partially broken away perspective view of the disposal field dosing system of the present invention having a single outlet conduit, overflow conduit, and feed conduit.

Referring now to FIGS. 5 and 6, disposal field dosing system 30 further comprises a float 36 which comprises a chamber 36*a* with an opening 36*b* on an upper surface of float 36 providing access to chamber 36*a*. Although float 36 is generally illustrated as being a box or box-shaped, it can in fact, assume any desirable shape provided it has an upper surface containing opening 36*b*. Float 36 can be constructed of any material sufficient to maintain dimensional stability of the float yet having a specific gravity of greater than one. It may also be necessary to provide ballast to float 36 depending on the number of feed conduits 38 contained therein, as discussed in more detail hereinbelow. For instance, if as illustrated in FIG. 5, there is only one feed conduit 38 within float 36, then forming float 36 of a high density plastic such as PVC provides sufficient ballast. However, if there are three feed conduits, 38', 38", and 38''', it may be necessary to provide ballast to facilitate proper sinking of float 36.

At least one feed conduit 38 is also provided, having an inlet end 38*a* which is located within float chamber 36*a* and an outlet end 38*b* which is in operative connection with inlet end 32*b* (through tee connector 35 when present) of outlet conduit 32 and thereby the disposal field to which effluent 100 is being supplied. Feed conduit 38 also generally comprises a dimensionally stable pipe formed, for instance, of a high density plastic such as PVC or polyethylene.

Inlet end 38*a* of feed conduit 38 should be located closer to the end 37 of float 36 then the portion of opening 36*b* furthest away from end 37. In other words, and referring now to FIG. 2, as float 36 is floating in effluent 100, inlet end 38*a* of feed conduit 38 should be higher than the "bottom" of opening 36*b* such that as effluent enters opening 36*b*, it fills chamber 36*a*, and does not immediately flow down feed conduit 38. Generally, inlet end 38*a* is located within about 1 diameter, and preferably about ½ of the diameter of feed conduit 38 from the end 37 of float 36 located furthest from outlet conduit 32.

As noted above, there can be more than one outlet conduit 32. In this case, there should be a feed conduit 38 for each outlet conduit 32. For instance, and as illustrated in FIG. 6, where disposal field dosing system 30 comprises outlet conduits 32', 32", and 32''', it should also comprise feed conduits 38', 38", and 38''', each corresponding to one of outlet conduits 32', 32", and 32'''.

Feed conduit 38 is in operative connection with outlet conduit 32 (even if via tee connector 35) via a jointed coupler 40, by which is meant a coupling means capable of flexing to permit float 36 to rise with effluent 100 while outlet conduit 32 is stationary. Jointed coupler 40 can comprise any means for permitting flow of effluent 100 from feed conduit 38 to outlet conduit 32 while float 36 is in various orientations. Preferably, jointed coupler 40 comprises a sleeve of relatively water-tight flexible material such as EPDM rubber which is connected to an outlet end 38*b* of feed conduit 38 and either inlet end 32*b* of outlet conduit 32 or inlet end 32*b'* of tee connector 35.

If desired, disposal field dosing system 30 can also comprise means for preventing excessive upward movement of float 36. This may be necessary because, during the first cycling of disposal field dosing system 30, float 36 may rise over the desired level of effluent 100 in structure 20. All cycles thereafter may be limited to the desired level, but limiting the upward movement of float 36 may be necessary after first installation of septic system 10. Means for limiting the upward movement of float 36 can simply comprise a chain 36*c* which is connected to both the bottom of float 36 and the bottom of structure 20, or an upward movement blocking device such as a bar 36*d* which extends across structure 20 to block further upward movement of float 36, as illustrated in FIGS. 5 and 6, respectively. The skilled artisan will recognize that other means for limiting the upward movement of float 36 may be possible, if deemed necessary. The means for limiting the upward movement of float 36 is preferably adjustable to permit changing of the upper limit of movement of float 36. For instance, chain 36*c* can be shortened of lengthened to provide this adjustment.

Figure 2:
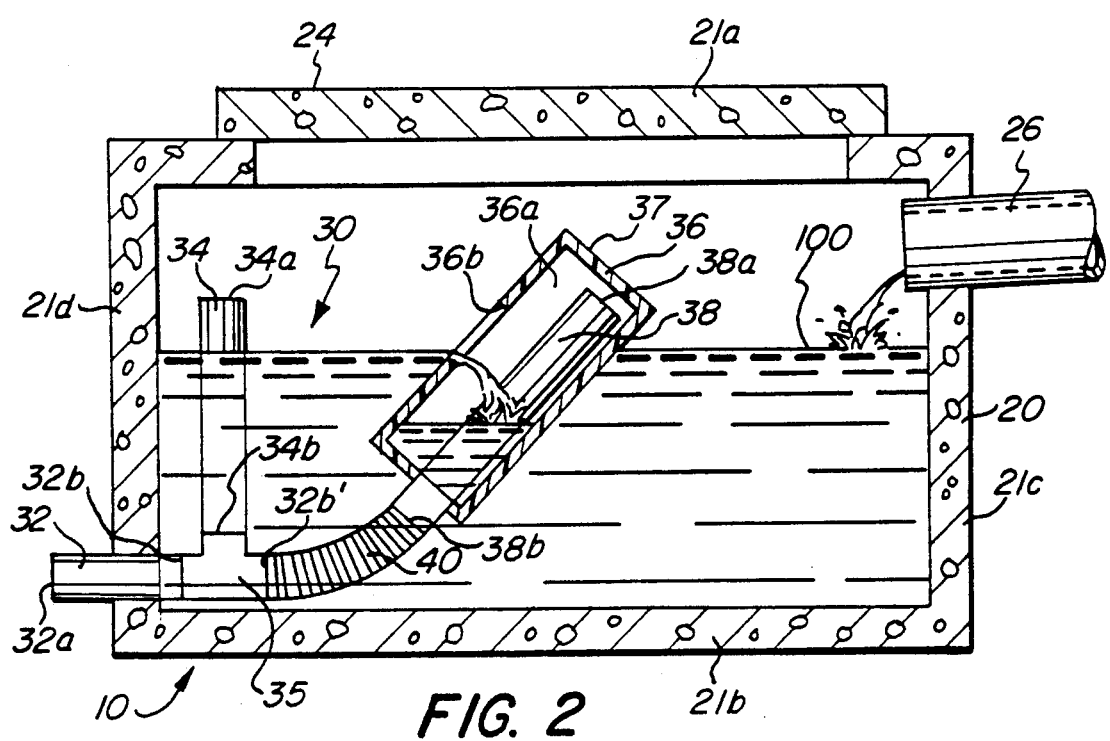
FIG. 2 is a cross-sectional side plan view of the septic system of FIG. 1 wherein the effluent has reached the level of the opening in the float and begins to fill the float chamber.
Figure 3:
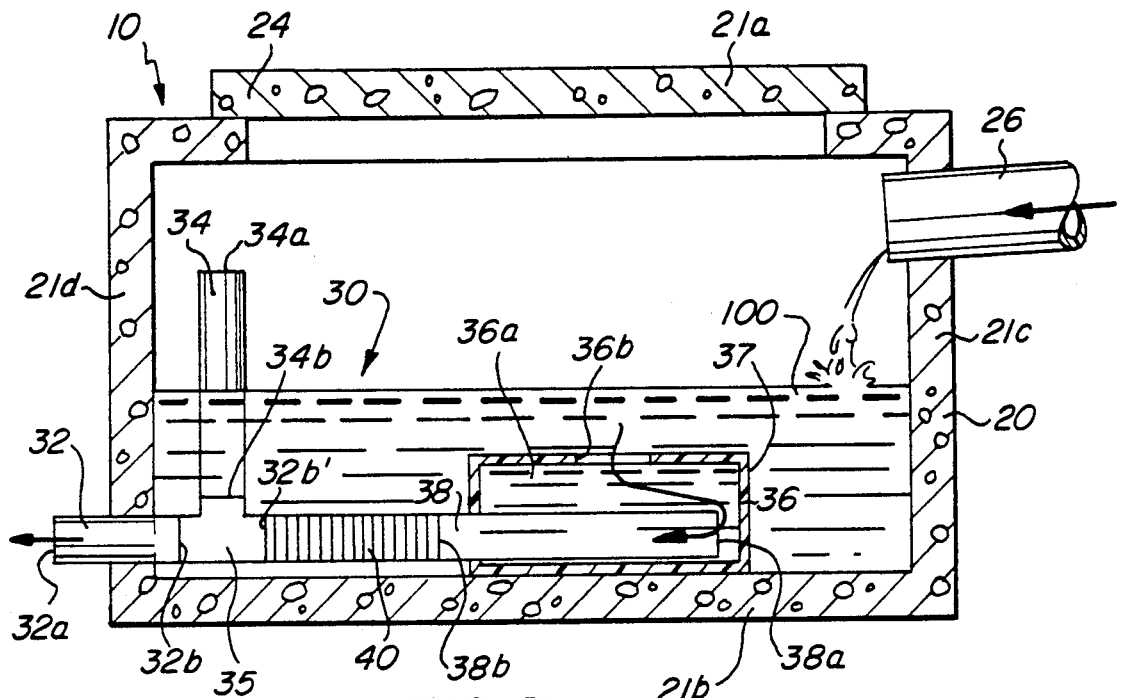
FIG. 3 is a cross-sectional side plan view of the septic system of FIG. 1 showing the chamber of the float having been filled and the float sunk to the bottom of the structure, such that effluent flows therethrough and towards the disposal field.
Figure 4:
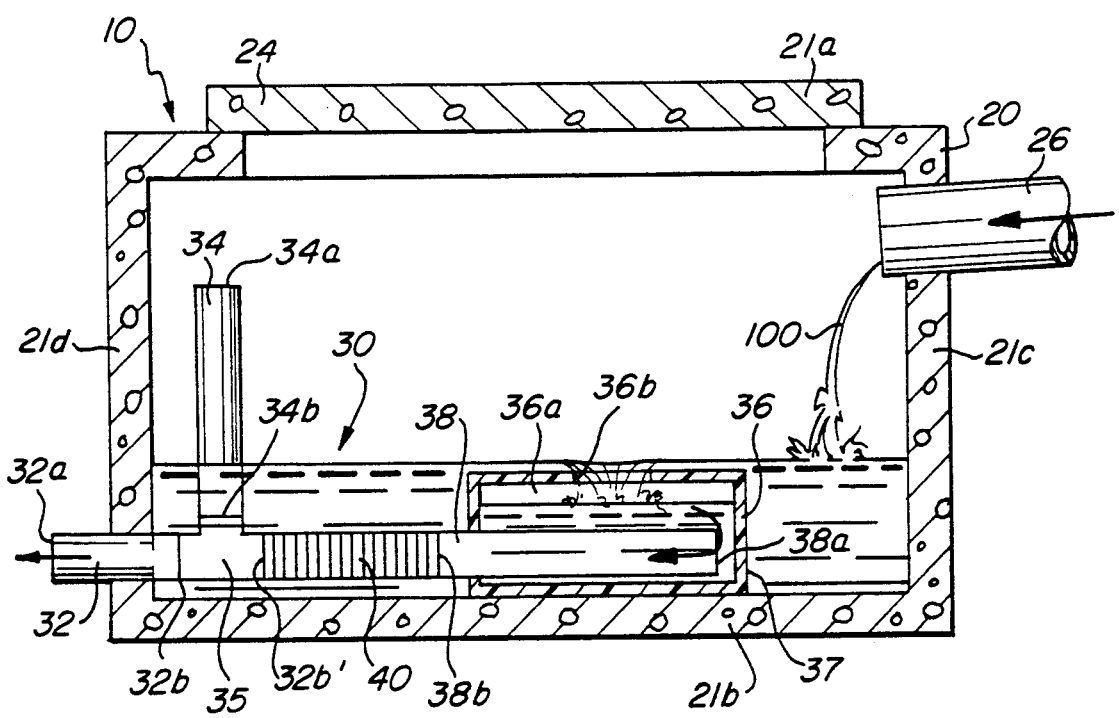
FIG. 4 is a cross-sectional side plan view of the septic system of FIG. 1 showing outflow of effluent through the float until the effluent reaches the top level of the float.

The operation of effluent dosing septic system 10 is illustrated with respect to FIGS. 1–4. In FIG. 1, it can be seen that as effluent 100 fills structure 20, float 36 is relatively empty and buoyant. Float 36 floats on the surface of effluent 100 until it can float no higher. As effluent 100 rises to the level of opening 36b in float 36, as illustrated in FIG. 2, effluent 100 spills into opening 36b and fills chamber 36a, causing float 36 to sink. Effluent 100 in tank 20 then discharges through float 36, feed conduit 38, jointed coupler 40, tee 35, and outlet conduit 32, as illustrated in FIG. 3, dosing the disposal field to which outlet conduit 32 provides effluent 100. As structure 20 continues to empty to the top of float 36, as illustrated in FIG. 4, chamber 36a empties, which permits float 36 to resume floating to repeat another cycle.

A method for dosing effluent into a disposal field in accordance with the invention generally follows the operation of septic system 10 discussed above, and involves feeding effluent 100 into a relatively water-tight walled structure 20 where it causes a float 36 to float thereon and rise until it can float no higher. Effluent 100 is then fed into a chamber 36a in float 36, causing float 36 to sink, which then feeds effluent 100 through a feeding conduit 38 disposed within chamber 36b and through an outlet conduit 32 to a disposal field. As effluent 100 is fed to the disposal field, the level of effluent 100 within structure 20 lowers until it no longer is fed through float 36 which causes float 36 to empty, allowing it to float once again.

The present invention, therefore, provides a new and useful system and method for dosing effluent into a disposal field by providing a series of unique elements which cooperate to avoid the disadvantages of prior art dosing systems.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A septic system for dosing effluent into a disposal field, comprising:
   a) a relatively water-tight walled structure capable of accumulating a volume of said effluent;
   b) means for feeding said effluent to said structure;
   c) a disposal field dosing system which comprises
      i) at least one outlet conduit having an outlet end and an inlet end, said conduit extending through a wall of said structure such that the outlet end of said conduit extends to a disposal field and the inlet end of said conduit is disposed within said structure, wherein said conduit is located within said structure near the bottom thereof;
      ii) a stand pipe which extends from each of said outlet conduits toward the top of said structure such that an opening of said stand pipe is located at a level in said structure which defines a maximum high point of said effluent in said structure;
      iii) a float comprising a chamber having an opening on an upper surface thereof;
      iv) at least one feed conduit having an inlet end located within said float chamber and an outlet end in operative connection with the inlet end of said outlet conduit; and
      v) a jointed coupler which forms the operative connection between said at least one feed conduit and at least one outlet conduit, said float moving upwardly as the level of said effluent in said structure increases in response to said feeding means, the upward movement of said float being limited by said feed conduit to provide for filling of said float chamber and sinking of said float to permit drainage of said effluent from said structure.

2. The system of claim 1, wherein said float is constructed of a material having a specific gravity of greater than 1.

3. The system of claim 1, wherein the inlet end of said at least one feed conduit is disposed within about 1 feed conduit diameter of an end of said float located furthest from said outlet conduit.

4. The system of claim 3, wherein the inlet end of said at least one feed conduit is disposed within about ½ feed conduit diameter of an end of said float located furthest from said outlet conduit.

5. The system of claim 1, wherein said jointed coupler comprises a sleeve of relatively watertight flexible material.

6. The system of claim 1, wherein said at least one outlet conduit within said structure comprises, at least in part, a tee connector from which extends said overflow conduit.

7. The system of claim 6, which comprises three outlet conduits, three overflow conduits, and three feed conduits.

8. The system of claim 1, which comprises means for limiting the upward travel of said float.

9. The system of claim 8, wherein said limiting means comprises a chain having one end secured to said float and another end secured to said structure.

10. The system of claim 1, wherein said structure comprises a concrete tank.

11. The system of claim 10, wherein septic tank effluent is fed to said structure via an inlet conduit extending into said structure near the top thereof.

12. The system of claim 11, wherein septic tank effluent is fed to said structure through said inlet conduit via a pump.

13. A septic system for dosing effluent into a disposal field, comprising:
   a) a septic tank having a bottom and an upper portion;
   b) means for feeding said effluent into said tank at its upper portion to provide an effluent level that varies over a dosing cycle;
   c) a drain in the bottom of said tank for permitting effluent to exit from said tank into said disposal field;
   d) a float including a chamber for providing the float with buoyancy, said chamber having an opening on an upper surface thereof to permit the chamber to fill with effluent when said effluent level reaches said float opening, said float being moveable from a position adjacent the bottom of said tank to a predetermined level, said float moving upwardly as the level of said effluent in said tank increases to a position wherein the float reaches said predetermined level, said effluent entering said float chamber through said opening and causing said float to fill with effluent;
   e) means for connecting said float chamber to said drain comprising a conduit having an inlet end located within said float chamber and an outlet end in operative connection with said drain to permit flow of fluid therebetween, said float chamber filling with effluent and sinking toward said tank bottom to empty said effluent from said tank, said effluent level then falling below said float chamber opening to increase the effluent level in said tank to buoy said float and more it upwardly thereby beginning a new dosing cycle.

14. A septic system according to claim 13, wherein said conduit has a length which limits the upward movement of said float and defines said predetermined float level.

15. A septic system according to claim 14, wherein said float level is defined by a flexible cord having one end secured to said float and the other end secured to said tank.

16. A septic system according to claim 15, wherein said conduit comprises an elongate tube that is flexible and bendable, said one end of said conduit being connected in fixed relation to said tank, the other end of said conduit moving upwardly and downwardly with said float.

* * * * *